United States Patent
Engel et al.

(10) Patent No.: US 12,487,874 B1
(45) Date of Patent: Dec. 2, 2025

(54) AUTOMATICALLY GENERATING REPORTS OF INCIDENT EVENTS

(71) Applicant: PagerDuty, Inc., San Francisco, CA (US)

(72) Inventors: Leeor Engel, Toronto (CA); Max Li, Clarksburg, MD (US); Mustafa Haddara, Toronto (CA); Abdollah Bashir, Toronto (CA); Sean Scott, Seattle, WA (US)

(73) Assignee: PagerDuty, Inc., San Francisco, CA (US)

( * ) Notice: Subject to any disclaimer, the term of this patent is extended or adjusted under 35 U.S.C. 154(b) by 24 days.

(21) Appl. No.: 18/392,763

(22) Filed: Dec. 21, 2023

(51) Int. Cl.
*G06F 11/00* (2006.01)
*G06F 11/07* (2006.01)
*G06F 16/34* (2019.01)

(52) U.S. Cl.
CPC ........ *G06F 11/0769* (2013.01); *G06F 16/345* (2019.01)

(58) Field of Classification Search
CPC ............. G06F 11/0769; G06F 11/0775; G06F 11/0766; G06F 11/3065; G06F 11/3072; G06F 11/3086; G06F 16/345; G06F 16/3329; G06F 16/3344
See application file for complete search history.

(56) References Cited

U.S. PATENT DOCUMENTS

| | | | |
|---|---|---|---|
| 2024/0430173 A1* | 12/2024 | Coudert | H04W 16/18 |
| 2025/0005589 A1* | 1/2025 | Li | G06Q 30/01 |
| 2025/0080396 A1* | 3/2025 | Titon | H04L 43/08 |
| 2025/0086211 A1* | 3/2025 | Bolcer | G06F 16/3344 |
| 2025/0095096 A1* | 3/2025 | Zadeh | G06Q 50/265 |
| 2025/0111380 A1* | 4/2025 | Wilson | G06Q 30/016 |

OTHER PUBLICATIONS

Ray, Archana Tikayat et al., Examining the Potential of Generative Language Models or Aviation Safety Analysis: Case study and Insights Using the Aviation Safety Reporting System (ASRS), Aerospace, Aug. 2023 (Year: 2023).*

(Continued)

*Primary Examiner* — Marc Duncan
(74) *Attorney, Agent, or Firm* — Baker Botts L.L.P.

(57) ABSTRACT

A computer-implemented method executed using one or more processors of an incident management system, the computer-implemented method comprising accessing one or more data sets of information associated with an incident event corresponding to an incident associated with a computer system; generating a prompt based on the one or more data sets of information, wherein generating the prompt comprises generating a plurality of sub-prompts to be provided to a machine-learning model for generating a report of the incident event in accordance with a predetermined criteria; inputting the prompt into a machine-learning model that has been trained to generate a report of the incident event based on the prompt; outputting, by the machine-learning model, the report of the incident event, wherein the report comprises an analysis of the incident event; transmitting the report to one or more computing devices associated with the computer system.

30 Claims, 7 Drawing Sheets

(56) References Cited

OTHER PUBLICATIONS

Jin, Pengxiang et al., Assess and Summarize: Improve Outage Understanding with Large Language Models, ESEC/FSE, Nov. 2023 (Year: 2023).*

Singla, Tanmay et al., An Empirical Study On Using Large Language Models to Analyze Software Supply Chain Security Failures, ACM, Nov. 30, 2023 (Year: 2023).*

Williamson, Simon, "Prompt injection: What's the worst that can happen?" https://simonwillison.net/2023/Apr/14/worst-that-can-happen/, Apr. 14, 2023, Simon Williamson Web Blog, 11 pages.

Nesher, Guy, "Introduction to LongChain" https://semaphoreci.com/blog/langchain, Nov. 15, 2023, Semaphore, Software Engineering, Learn More Blog, 7 pages.

* cited by examiner

AUTOMATICALLY GENERATING REPORTS OF INCIDENT EVENTS

COPYRIGHT NOTICE

A portion of this patent document's disclosure contains material subject to copyright protection. The copyright owner has no objection to the facsimile reproduction by anyone of the patent document or the patent disclosure, as it appears in the Patent and Trademark Office patent file or records, but otherwise reserves all copyright or rights. © 2023 PagerDuty, Inc.

TECHNICAL FIELD

One technical field of the present disclosure is computer incident management systems. Another technical field is generative artificial intelligence (AI).

BACKGROUND

The approaches described in this section are approaches that could be pursued but not necessarily approaches that have been previously conceived or pursued. Therefore, unless otherwise indicated, it should not be assumed that any approaches described in this section qualify as prior art merely by their inclusion.

Incident response and management systems are distributed computer systems programmed to provide structured ways for enterprises to identify, respond to, and manage service problems or failures, security breaches, and/or cyberattacks. Incident response aims to restore the operation of services, servers, or virtual compute instances, limit damage, recover quickly, and prevent future similar issues or attacks.

Following the incident response, an incident report is generally produced to ensure future operational reliability and improvements and to memorialize the incident, its causes, and remedial steps. An incident report can be informally termed a "postmortem" and can be generated once or in multiple versions. They are most often produced by the site reliability engineers (SREs) or other members of technical staff (MTS) previously responsible for the incident response. For example, such incident reports generally include a detailed description of exactly what went wrong to cause the incident event, along with a list of steps to prevent a similar incident from occurring again. However, producing incident reports often relies on the SREs or MTS aggregating various handwritten and electronic notes, documents, and forms associated with the incident event and then manually drafting the incident report while simultaneously having to respond to other potential incidents. Thus, such manual incident report production processes may be time-consuming, cumbersome, and susceptible to human error because SREs or MTS may inadvertently misrepresent or erroneously document important information derivable from the incident response.

Therefore, there is a significant need for tools or techniques to facilitate incident postmortem data gathering, generating and storing, with the automatic evaluation of all data relevant to an incident. A need also exists for executing the process of generating and storing postmortems more efficiently, with less or no human effort and less use of CPU cycles and network messages or bandwidth.

SUMMARY

The appended claims may serve as a summary of the invention.

DETAILED DESCRIPTION

Figure 1:
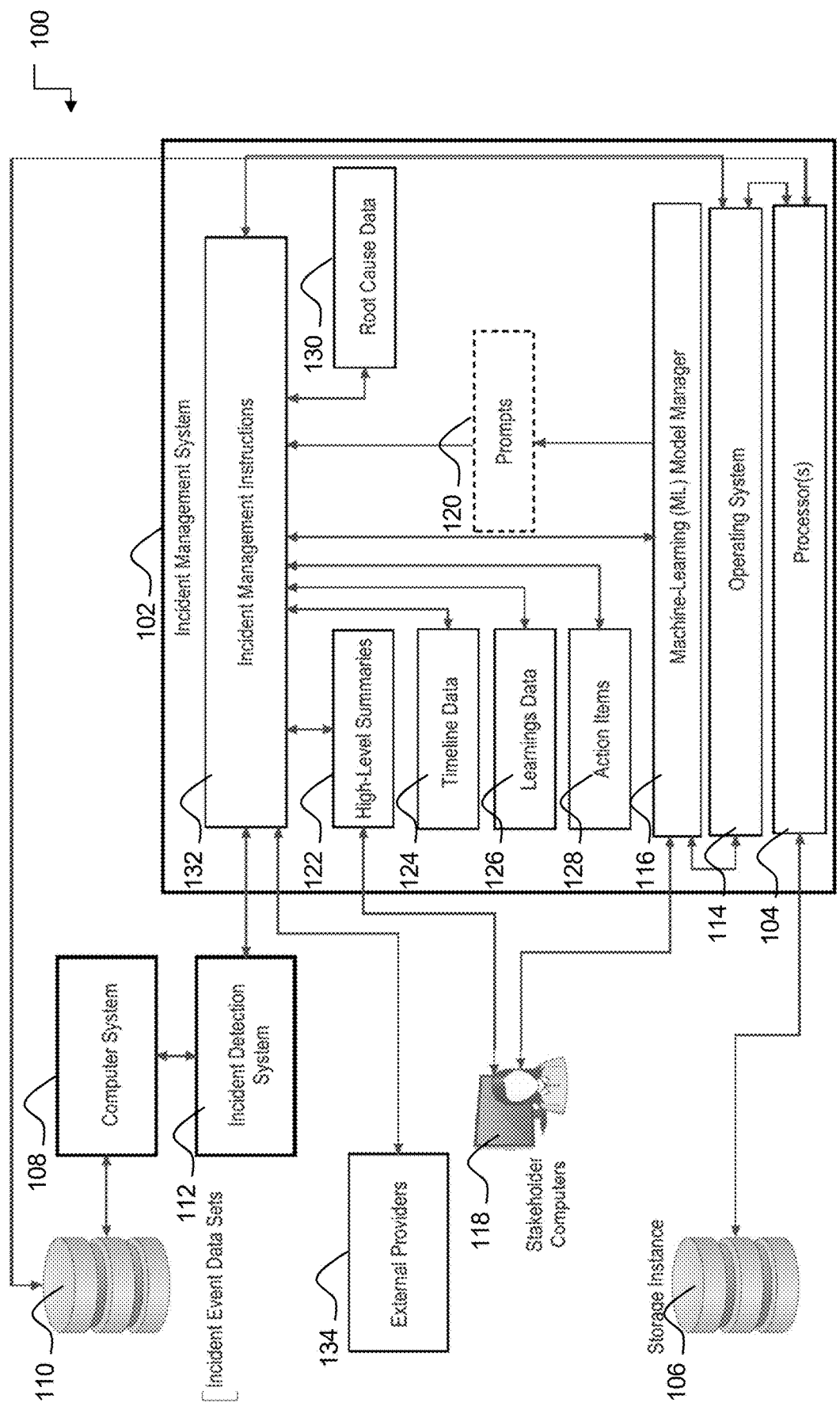
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail outlined in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. GENERAL OVERVIEW

In embodiments, smart incident postmortems use generative artificial intelligence to support automatic, accurate, high-quality, and efficient generation of postmortems. In one approach, a processing device, or a service or program executing on the processing device, can programmatically call a specified endpoint or API call. A call can specify an incident identifier. When called, the endpoint loads text data and messages associated with the incident identifier, programmatically sends the text data and messages to a machine learning model such as an LLM, and uses the response to create and digitally store a first draft for a postmortem. Smart incident postmortems can comprise collecting a plurality of datasets from different, unrelated systems, but all relating to the same incident identifier, and presenting the datasets collectively as context to the LLM, with a prompt that is engineered to generate new text for a postmortem in a specified format and content that is based on and influenced by the context. Examples of the unrelated systems can include chat channels, email messages, code repositories, change logs, or system logs. In this manner, an intelligent incident postmortem task can be programmed as a summarization task constrained by a set of classification tasks, which is more straightforward than a more complex and, therefore, compute-intensive task.

The smart incident postmortem techniques of the disclosure enable the automatic generation of incident postmortems. Incident postmortems can be quickly and accurately drafted and tailored to particular stakeholders while also providing an accurate representation of the current state of an incident. Sufficiently detailed yet concise summaries of an incident, causes, and remedial steps can be generated automatically. Incident postmortems can include text that the generative AI system outputs because it is relevant given the context and all knowledge encapsulated in the AI system. Responders can review and modify the postmortem before sending it out, thus ensuring that the update is accurate and complete.

The techniques described herein for smart incident postmortems also facilitate greater control of what is relevant to include in an incident status report. For example, the incident data from which a postmortem is generated could include data unrelated to the incident or the resolution or impact of the incident. To illustrate, some incident data could be retrieved from a chat or instant message system. The incident data could include messages related to a lunar eclipse because a lunar eclipse occurred as the incident was ongoing, even though the eclipse is unrelated in technical terms to the incident or remedial steps that resolved the incident. Limiting the postmortem to pre-selected reportable criteria, using engineered prompts, allows the data related to the lunar eclipse to be automatically excluded or ignored.

Furthermore, the techniques described herein for smart incident postmortems can mitigate adversarial security attacks where a hacker might, for example, inject data irrelevant to incident response in the incident data. Using engineered prompts, such data can be filtered out or ignored based on the reportable criteria. In some embodiments, user interface programming can resist prompt injection attacks.

The techniques disclosed herein are described in the context of or concerning incident data that may relate to IT components and services. The disclosure is not so limited. The techniques described herein can be applied to any corpus of data that is to be summarized based on a set of identified, relevant reportable criteria.

The term "organization" or "managed organization" refers to a business, a company, an association, an enterprise, a confederation, or the like.

The term "event," as used herein, can refer to one or more outcomes, conditions, or occurrences that an incident management system may detect. "Detected," in this context, includes techniques by which an event is observed, identified, noticed, or monitored. An incident detection system and/or an event management bus, also called an event ingestion and processing system, may be configured to monitor various events depending on the needs of an industry and/or technology area. For example, IT services may generate events in response to one or more conditions, such as computers going offline, memory overutilization, CPU overutilization, storage quotas being met or exceeded, applications failing or otherwise becoming unavailable, networking problems electrical problems, customer service requests, or a combination thereof. Networking problems include latency, excess traffic, unexpected lack of traffic, or intrusion attempts. Electrical problems can include power outages, voltage fluctuations, or current variations.

Events may be provided to the incident detection system or event management bus using one or more messages, emails, telephone calls, library function calls, and calls to an application programming interface (API), including any signals provided to an event management bus indicating that an event has occurred. One or more third-party and/or external systems may be configured to transmit, provide, or expose event messages to the incident detection system or event management bus.

The term "responder" can refer to a person or entity, represented or identified by persons, that may be responsible for responding to an event associated with a monitored application or service. A responder is responsible for responding to one or more notification events. For example, responders may be members of an IT team providing support to company employees. Responders may be notified if an event or incident they are responsible for handling at that time is encountered. In some embodiments, a scheduler application may be arranged to associate one or more responders with on-call times during which they are responsible for handling particular events or services. A responder who is determined to be responsible for handling a particular event may be referred to as a responsible responder. Responsible responders may be considered to be on-call and/or active during the time designated by the schedule to be available.

The term "incident," as used herein, can refer to a condition or state in the managed networking environments that requires some form of resolution by a user or automated service. Typically, incidents may be a failure or error in operating a managed network and/or computing environment. One or more events may be associated with one or more incidents. However, not all events are associated with incidents, and not every incident is a failure.

The term "incident response" can refer to the actions, resources, services, messages, notifications, alerts, events, or the like related to resolving one or more incidents. Accordingly, services that a pending incident may impact may be added to the incident response associated with the incident. Likewise, resources responsible for supporting or maintaining the services may also be added to the incident response. Further, log entries, journal entries, notes, timelines, task lists, status information, or the like may be part of an incident response.

The term "notification message," "notification event," or "notification" as used herein can refer to a communication provided by an incident management system to a message provider for delivery to one or more responsible resources or responders. A notification event may inform responsible resources that one or more event messages were received. For example, in at least one of the various embodiments, notification messages may be provided to one or more responsible resources using SMS texts, MMS texts, email, Instant Messages, mobile device push notifications, HTTP requests, voice calls (telephone calls, Voice Over IP calls (VOIP), or the like), library function calls, API calls, URLs, audio alerts, haptic alerts, other signals, or the like, or a combination thereof.

The term "team" or "group" refers to one or more responders who may be jointly responsible for maintaining or supporting an organization's services or systems.

In various embodiments, the disclosure encompasses the subject matter of the following numbered clauses:

1. A computer-implemented method executed using one or more processors of an incident management system, the computer-implemented method comprising accessing one or more data sets of information associated with an incident event corresponding to an incident associated with a computer system; generating a prompt based on the one or more data sets of information, wherein generating the prompt comprises generating a plurality of sub-prompts to be provided to a machine-learning model for generating a report of the incident event in accordance with predetermined criteria; inputting the prompt into a machine-learning model that has been trained to generate a prediction of a report of the incident event based on the prompt; outputting, by the machine-learning model, the prediction of a report of the incident event, wherein the prediction of the report comprises an analysis of the incident event; transmitting the report to one or more computing devices associated with the computer system.

2. The computer-implemented method of clause 1, wherein accessing the one or more data sets of information associated with the incident event comprises accessing one or more data sets of text documents or text messages produced by site reliability engineers (SREs) associated with a response to the incident event.

3. The computer-implemented method of clause 2, wherein the incident event comprises one or more of a reduced service performance, a downtime, an outage, a business process issue, or a failure of the computer system.

4. The computer-implemented method of clause 1, wherein generating the prompt comprises generating one or more of an N-shot prompt, a chain-of-thought (COT) prompt, or a generated knowledge prompt.

5. The computer-implemented method of clause 1, further comprising inputting the prompt into the machine-learning model by transmitting the prompt to one or more large language models (LLMs) utilizing an application programming interface (API) associated with the one or more LLMs; outputting, by the machine-learning model, the prediction of a report of the incident event by receiving a response from the one or more LLMs.

6. The computer-implemented method of clause 5, further comprising prior to transmitting the prompt to the one or more LLMs utilizing the API, performing one or more quality assurance (QA) assessments based on the content of the prompt.

7. The computer-implemented method of clause 1, wherein outputting the prediction of a report of the incident event further comprises dividing the one or more data sets of information associated with the incident event into a plurality of subsets of information; for each of the plurality of subsets of information, inputting a first prompt into the machine-learning model configured to prompt the machine-learning model as trained to generate a prediction of a textual summary based on the subset of information; inputting a second prompt into the machine-learning model configured to prompt the machine-learning model as trained to generate a prediction of a final textual summary based on the predictions of textual summaries.

8. The computer-implemented method of clause 7, wherein dividing the one or more data sets of information further comprises dividing the one or more data sets of information into a plurality of subsets of information in accordance with a token threshold associated with the machine-learning model.

9. The computer-implemented method of clause 8, wherein the token threshold comprises a threshold of approximately 4,000 tokens, approximately 8,000 tokens, approximately 16,000 tokens, or approximately 32,000 tokens.

10. The computer-implemented method of clause 1, wherein outputting the prediction of a report of the incident event further comprises: dividing the one or more data sets of information associated with the incident event into a plurality of subsets of information; for each of the plurality of subsets of information, inputting a first prompt into the machine-learning model configured to prompt the machine-learning model as trained to generate a set of note-taking texts based on the subset of information; inputting a second prompt into the machine-learning model configured to prompt the machine-learning model as trained to generate the prediction of a report of the incident event based on the sets of note-taking texts.

11. The computer-implemented method of clause 1, wherein outputting the prediction of a report of the incident event comprises outputting, by the machine-learning model, the prediction of a report of the incident event in accordance with the predetermined criteria.

12. The computer-implemented method of clause 11, wherein the predetermined criteria comprises criteria identified based on a historical aggregate of analyses of incident events with a computer system.

13. The computer-implemented method of clause 1, further comprising outputting, by the machine-learning model, the prediction of a report of the incident event in accordance with the predetermined criteria and a predetermined format.

14. The computer-implemented method of clause 13, wherein the predetermined format comprises a JavaScript Object Notation (JSON) file including a plurality of predetermined sections, each of the plurality of predetermined sections corresponding to a different sub-analysis of the analysis of the incident event.

15. The computer-implemented method of clause 14, wherein the plurality of predetermined sections comprises two or more of a summary section, a timeline section, a learnings section, a root-cause analysis section, or an action-items section.

16. The computer-implemented method of clause 14, wherein inputting the prompt into the machine-learning model comprises inputting the plurality of sub-prompts into the machine-learning model, each of the plurality of sub-prompts being configured to prompt the machine-learning model to generate content corresponding to a different one of the plurality of predetermined sections.

17. The computer-implemented method of clause 1, wherein the machine-learning model comprises a large language model (LLM).

18. The computer-implemented method of clause 1, wherein the machine-learning model comprises a selected one of a plurality of large language models (LLMs).

2. STRUCTURAL & FUNCTIONAL OVERVIEW 2.1 Distributed Computer System Example

FIG. 1 illustrates a distributed computer system showing the context of use and principal functional elements with which one embodiment could be implemented. In an embodiment, a computer system organized as an incident management system 102 may include components implemented partially by hardware at one or more computing devices, such as one or more hardware processors 104 executing stored program instructions stored in one or more storage instances 106 for performing the functions described herein. In other words, all functions described herein are intended to indicate operations performed using programming in a special or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of automatic remediation of computer incidents. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In certain embodiments, a computer system 108 is the subject of an incident event. Computer system 108 is communicatively coupled to a database 110, which may include a relational database suitable for storing one or more data sets of information associated with an incident event with the computer system 108, such as reduced service performance, downtime, outage, or failure. For example, in some embodiments, the database 110 may store one or more data sets of text or incident data. Text data may comprise notes, writeups, emails, forms, webpages, or meeting minutes. Text data may comprise messages like text messages, chat messages, posts, or transcripts. Incident data may comprise text or data that may be produced, for example, by site reliability engineers (SREs) associated with an incident response to the incident event. An incident or event could involve reduced service performance, downtime, an outage, a failure, or another issue relating to the computer system 108. The computer system 108 is further communicatively coupled to an incident detection system 112, which is programmed to continuously monitor the computer system and identify service issues, errors, failures, attacks, or other incidents. For purposes of illustrating a clear example, FIG. 1 shows one computer system 108, but practical embodiments can include any number of computer systems that are subject to incident detection using one or more instances of the incident detection system 112.

Incident detection system 112 is communicatively coupled to the incident management system 102, which, as noted previously, is coupled to at least one storage instance 106. The incident management system 102 may include one or more processors 104, which host or execute system services, primitives, or libraries, which may be integrated into an operating system 114. In one embodiment, the incident management system 102 may include one or more virtual compute instances in a private data center or public, cloud computing-based data center, and the storage instance 106 may include one or more virtual storage instances. Alternatively, the incident management system 102 can use an on-prem implementation in one or more server computers, server clusters, or other networked computers.

The incident management system 102 hosts or executes a set of incident management instructions 132 and a machine-learning model manager 116, each including one or more computer programs, endpoints, services, methods, or functions that interoperate to execute the functions described in other sections. In general, incident management instructions 132 are programmed to generate and transmit incident updates or reports to stakeholder computers 118 and receive updates from the stakeholder computers 118. In certain embodiments, the machine-learning model manager 116 may include a software system, a software service, or other similar system that may be suitable for generating prompts 120 based on the one or more incident event data sets stored in the relational database 110 to be provided to a machine-learning model for generating a report of the incident event following a predetermined criteria. In various embodiments, the machine learning model can comprise one or more large language models (LLMs) or an interface to an application programming interface (API) of a generative AI system.

As used herein, a "prompt" may refer to any text or set of textual data that may be provided to a language model (LM) or LLM to elicit a response from the LM or LLM in accordance with user intent. For example, in one embodiment, the "prompt" may be sent to an API of the LM or LLM, in which the prompt may be utilized to instruct the LM or LLM and guide the response of the LM or LLM toward a specific content, specific intent, and/or specific context.

In one embodiment, the incident management system 102 may access the one or more incident event data sets stored in the relational database 110 and extract data, including, for example, high-level data 122 associated with the incident event or the response to the incident event, timeline data 124 associated with the incident event or the response to the incident event, learnings data 126 associated with the incident event or the response to the incident event, action items 128 associated with the incident event or the response to the incident event, and root cause data 130. In certain embodiments, the machine-learning model manager 116 may be suitable for generating the prompt 120 in accordance with specified criteria and then further calling the machine-learning model to generate a prediction of a report of the incident event in accordance with the predetermined criteria. For example, as will be discussed in greater detail below, the machine-learning model manager 116 may generate the prompt 120 and access the data to be included in the generated report, send the prompt 120 to an API of the LLM, and receive via the API of the LLM a response to the prompt 120 as generated by the LLM. The data can comprise high-level data 122, timeline data 124, learnings data 126, and/or root cause data 130.

In certain embodiments, the machine-learning model manager 116 may include one or more sets of program instructions that are programmed to receive queries or prompts from one of the stakeholder computers 118 and to interact with an LLM to produce a response corresponding to a prediction of a generated report of the incident event with the computer system and processors 104. TABLE 1 lists example capabilities of the machine-learning model manager 116 and example responses:

TABLE 1

EXAMPLE CAPABILITIES

| Capability | Description | Example |
| --- | --- | --- |
| Summarize incident state | Describe the current state of an ongoing incident | "Bob, it looks like we are receiving 4xx errors on the API Load Balancer technical service that supports the B2B Order Processing Business Service." |
| Check first-party services | Check the services that are related to the ongoing incident and their status. | "I've also checked any related services that might be contributing to this incident, and all technical services are reporting healthy." |
| Summarize incident timeline and changes. | Ability to describe the incident in timeline mode and what has happened to the service before the incident. | "The initial event triggered 10 minutes ago and was delayed by transient detection as these usually heal in 5 minutes or less. This morning, a new release supporting enhanced catalog search was published to the Android and iOS app stores. See related changes:" |
| Check on-call | Able to provide who is on-call for a service | "Who is on call for OWT?" |
| Service context | Provide the current state of a given service | "Is there anything wrong with the OWT service?" |
| Check 3rd party services. | If the alerts aren't generated directly to the service, check the path of the alert to ensure all systems on the path are ok. | "The alerts are coming from Cloud infrastructure through ServerMonitor, so I checked to make sure they aren't having any issues:" |
| Generate prompts | Service generates the prompts, calls the LLM, performs pre-processing and post-processing, and logs all interactions for later monitoring. | 1. A high-level summary of what happened:<br>a. "Which services and customers were affected?"<br>b. "How long and severe was the issue?"<br>c. "Who was involved in the response?"<br>d. "How was the problem ultimately fixed?"<br>2. A root cause analysis:<br>a. "What were the origins of failure?"<br>b. "Why is this believed to have happened?"<br>3. Steps taken to diagnose, assess, and resolve: |

TABLE 1-continued

EXAMPLE CAPABILITIES

| Capability | Description | Example |
| --- | --- | --- |
| | | a. "What actions were taken?"<br>b. "Which were effective?"<br>c. "Which were detrimental?"<br>4. A timeline of significant activity:<br>a. Centralize key activities from chat conversations, incident details, forms, emails, and so forth.<br>5. Learnings and next steps:<br>a. "What went well?"<br>b. "What didn't go well?"<br>c. "How do we prevent this issue from happening again?" |
| Past remediations | Provide information on how previous related incidents were remediated through history and post-mortem information | Alice: "What have we done in the past for incidents like this?"<br>Assistant: "The most recent incident I can find where 4xx errors were elevated, a Rolling Restart of the cluster was able to resolve the issue after completion. However, there were no recent changes at the time. Three months ago, Bob responded to a similar incident related to application updates and had to initiate a code rollback on the API endpoints until engineering was able to fix the application." |
| Audit log and summarization | Ability to show all changes that have been made since the incident started, including reasons/history for the options taken | Vincent (Pre-defined question): "Can you summarize what's been done so far?"<br>Assistant: "Sure! Vincent, after investigating this incident, this incident is similar to INC012345 from 3 months ago, where Sarah implemented a code rollback, so Bob determined the incident needed to be escalated to your team. Here are the recent application updates:"<br>Show recent changes for API nodes and mobile applications and/or use a change log to retrieve a set of code and highlight the error |
| Postmortem information retrieval: | Ability to query information from previous postmortems | Vincent: "Thanks! How long did it take Sarah to perform the code rollback once she started the process?"<br>Assistant: "Based on the notes in the incident, it looks like it took anywhere from 5-10 minutes to complete the code rollback and perform initial verification." |
| Status updates | Ability to send internal status updates and update the status page of the given service | Vincent: "Can you send out an internal status update letting everyone know it should be fixed in 15 mins?"<br>Assistant: Sends out status updates to subscribed stakeholders and to the private status page. |
| Monitoring API integration | After remediation, it can perform a health check on the associated systems | Vincent: "Everything is back up and running after the code rollback. How does it look?"<br>Assistant: "Vincent, thanks for checking! It looks like we've received a substantial number of clear events for incidents across the environment." |
| Incident escalation | | Assistant: "In both scenarios, the incident was declared a Major incident. Would you like to do that now?"<br>Vincent: "Yes" |
| Support case API integration | | Vanessa: "How many customers have open cases related to this incident, and are any of them flagged as renewal risk?"<br>Assistant: "There are 23 open CRM service cloud cases linked to this incident. Three of the service cloud cases are for accounts that are flagged as renewal risk: Acme Anvils, Retail4UShopping, and Scooter Share."<br>Vanessa: "Subscribe to the account teams for the impacted customers and send them an update now." |

TABLE 1-continued

EXAMPLE CAPABILITIES

| Capability | Description | Example |
| --- | --- | --- |
| Generate incident reports | Service generates incident reports in accordance with a particular criteria and format. | 1. A high-level summary of what happened:<br>a. "Which services and customers were affected?"<br>b. "How long and severe was the issue?"<br>c. "Who was involved in the response?"<br>d. "How was the problem ultimately fixed?"<br>2. A root cause analysis:<br>a. "What were the origins of failure?"<br>b. "Why is this believed to have happened?"<br>3. Steps taken to diagnose, assess, and resolve:<br>a. "What actions were taken?"<br>b. "Which were effective?"<br>c. "Which were detrimental?"<br>4. A timeline of significant activity:<br>a. Centralize key activities from chat conversations, incident details, forms, emails, and so forth.<br>5. Learnings and next steps:<br>a. "What went well?"<br>b. "What didn't go well?"<br>c. "How do we prevent this issue from happening again?" |

The stakeholder computers 118 broadly represent any computing devices of end users related to or concerned with the incidents that the incident management system 102 manages. The stakeholder computers 118 may include, in various embodiments, laptop computers, desktop computers, network computers, or mobile computing devices.

In FIG. 1, arrows that connect the computer system 108, relational database 110, incident detection system 112, incident management system 102 or its elements, storage instance 106, and stakeholder computers 118 represent network links. For the network links, various embodiments can use any combination of one or more local area networks, wide area networks, campus networks, or internetworks, using wired or wireless links, satellite links, or terrestrial links.

2.2 Incident Management System and ML Model Manager

Figure 2:
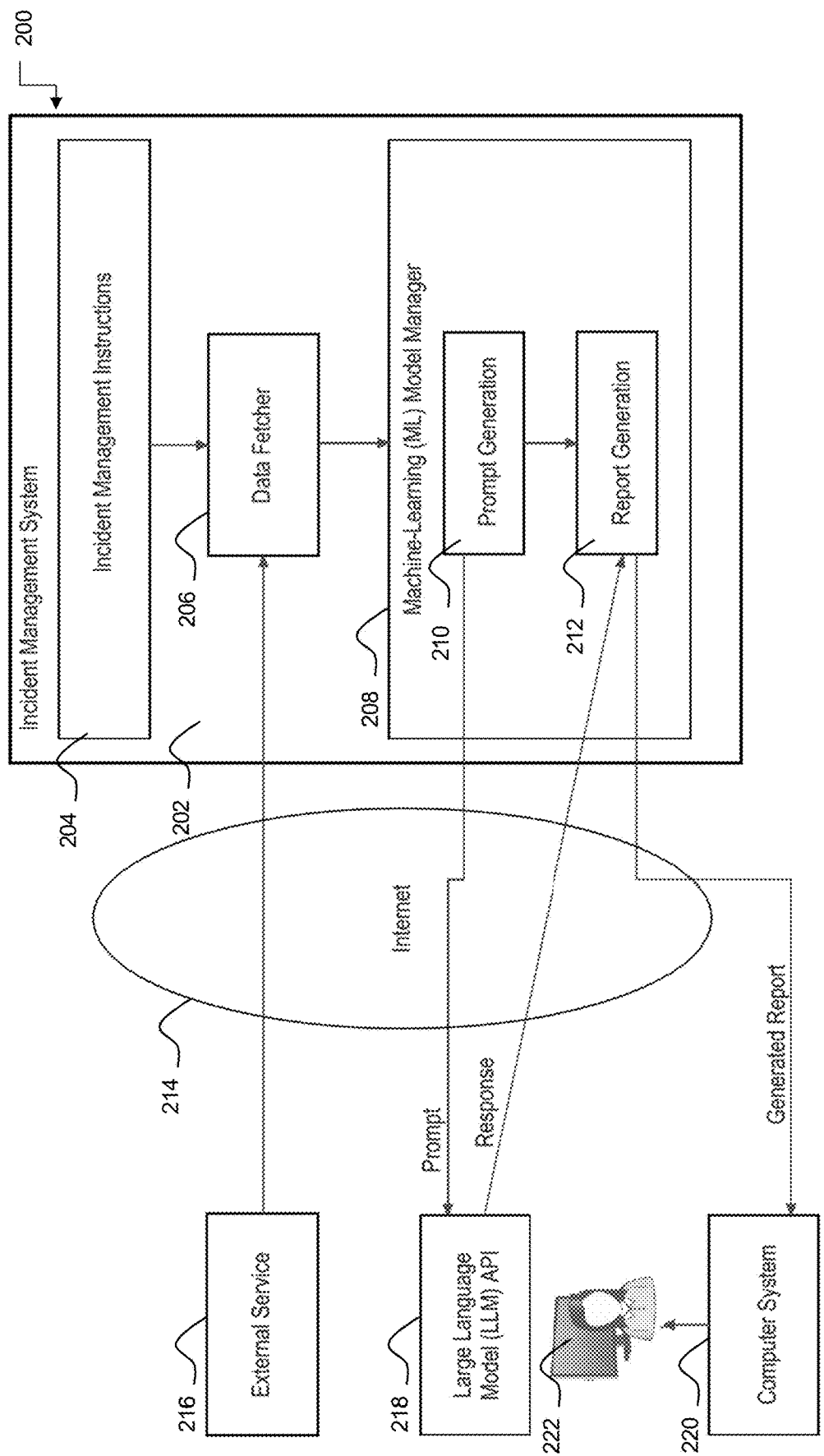
FIG. 2 illustrates an example of an incident management system and a machine-learning model manager system.

FIG. 2 illustrates an example incident management system and machine-learning model manager system 200. As depicted, the incident management system and machine-learning model manager system 200 include an incident management system 202, a machine-learning model manager 208, a network 214, and an interface to a large language model (LLM) of a generative AI system, in the form of one or more LLM APIs 218. In one embodiment, the incident management system 202 may be identical to the incident management system 102 as discussed above with respect to FIG. 1. As depicted, the incident management system 202 may include a data fetcher 204 that is communicatively coupled logically between the incident management instructions 132 and a prompt generation service 210 and an incident report generation service 212 within machine-learning model manager 208. In one embodiment, the machine-learning model manager 208 may be identical to the machine-learning model manager 116, as discussed above with respect to FIG. 1.

In certain embodiments, the data fetcher 204, the prompt generation service 210, and the report generation service 212 may each include sets of program instructions that are programmed to execute the functions as described herein. In certain embodiments, the data fetcher 206 may be programmed to request one or more data sets of textual documents (for example, notes, writeups, emails, forms, webpages, meeting minutes, and so forth), textual messages (for example, text messages, chat messages, posts, transcripts, SLACK messages, MICROSOFT TEAMS or ZOOM communications, and so forth), and/or other data that may be produced, for example, by site reliability engineers (SREs) associated with an incident response to the incident event (for example, reduced service performance, a downtime, an outage, or a failure) with a computer system, such as the computer system 108.

For example, in one embodiment, the data fetcher 204 may access the one or more incident event data sets stored in the relational database 110 and extract data, including, for example, high-level data 122 associated with the incident event or the response to the incident event, timeline data 124 associated with the incident event or the response to the incident event, learnings data 126 associated with the incident event or the response to the incident event, action items 128 associated with the incident event or the response to the incident event, and root cause data 130, as discussed above for FIG. 1. In some embodiments, the external service 210 may broadly represent any number of independent and/or third-party networked servers, services, APIs, or database systems.

In certain embodiments, the prompt generation service 210 may be suitable for generating prompts in accordance with predetermined criteria and format and then further calling and transmitting the prompt to a machine-learning model (for example, LLM) by way of one or more LLM APIs 218 to generate a prediction of a report of an incident event in accordance with the predetermined criteria and format. For example, the prompt generation service 210 may generate the prompt and access the data (for example, high-level data 122, timeline data 124, learnings data 126, root cause data 130, and so forth) to be included in the generated report send the prompt to one or more LLM APIs 218, and, finally, the report generation service 212 may then receive via the one or more LLM APIs 218 a response to the prompt as generated by the machine-learning model (for example, LLM). In one embodiment, the machine-learning model (for example, LLM) may include, for example, one or more LLMs with public APIs, such as CHATGPT or GOOGLE BARD, or LLMs with high-grade security and that do not retain, store, or learn from prompts or contexts, such as CHATGPT ENTERPRISE, Anthropic models like CLAUDE, etc. In another embodiment, the machine-learning model (for example, LLM) may include, for example, a custom-developed and trained generative pre-trained transformer (GPT), a transformer-based machine-learning model, or other similar sequence-to-sequence (Seq2Seq) based machine-learning model.

In certain embodiments, as previously noted, the prompt generation service 210 may generate the prompt by generating a number of sub-prompts to be provided by way of one or more LLM APIs 218 for generating a report of an incident event in accordance with predetermined criteria and format. For example, in some embodiments, the prompt generation service 210 may generate the prompt utilizing one or more of an N-shot prompt technique, a chain-of-thought (COT) prompt technique, a generated knowledge prompt technique, or other similar prompt engineering technique suitable for guiding and eliciting a response from the machine-learning model (for example, LLM) by way of one or more LLM APIs 218 in accordance with specific content, specific intent, and/or specific context. In certain embodiments, the predetermined criteria may include criteria identified based on a historical aggregate of analyses of incident events with a computer system, such as the computer system 108. For example, in one embodiment, the predetermined criteria may include, as examples, identified best practices or other effective methods (for example, learned by way of historical data captured over a period of time) for generating thorough, comprehensive, and actionable incident reports.

In certain embodiments, the predetermined format may include, for example, a JSON file including a summary section (for example, a blameless, high-level summary describing the incident event and the services, systems, and users that were affected, a severity of the incident event, a duration of the incident event, and so forth), a timeline section (for example, a chronological timeline of the incident event and the incident response, as well as event log data), a learnings section (for example, an identification of what went well, what did not go well, next steps, preventive measures, and so forth), a root-cause analysis section (for example, an identification of the origin of the incident event and any hypothesis as to the cause thereof), and an action-items section (for example, a list of action items completed or to be completed in response to the incident event). In certain embodiments, as will be further illustrated with respect to FIG. 3, prior to transmitting the prompt to the machine-learning model (for example, LLM) by way of one or more LLM APIs 218, the prompt generation service 210 may transmit the prompt to a data ecosystem for performing one or more quality assurance (QA) assessments based on a content of the prompt.

In certain embodiments, the report generation service 212 may be suitable for receiving via the one or more LLM APIs 218 a response to the prompt as generated by the machine-learning model (for example, LLM). For example, in certain embodiments, upon the machine-learning model (for example, LLM) receiving via one or more LLM APIs 218 the prompt from the prompt generation service 210, the machine-learning model (for example, LLM) may then output a response specifying a report of the incident event with a computer system, such as the computer system 108. Specifically, as depicted by FIG. 2, the machine-learning model (for example, LLM) may output the report of the incident event, and the report generation service 212 may receive via the one or more LLM APIs 218 a response corresponding to the report of the incident event. In one embodiment, the response received via one or more LLM APIs 218 and corresponding to the report of the incident event may include a blameless analysis of the incident event generated in accordance with the predetermined criteria and format.

In certain embodiments, as further depicted by FIG. 2, upon receiving via one or more LLM APIs 218 a response corresponding to a prediction of the report of the incident event, the report generation service 212 may then provide the generated report to a computer system 220 associated with one or more users or stakeholders 222. For example, in some embodiments, the computer system 220 may include one or more servers or other computing devices that may be associated with users or stakeholders 222 (for example, SREs, members of technical staff (MTS), and so forth), which may be provided the generated report.

Accordingly, the machine-learning model manager 208 may automatically generate an incident report (for example, JSON file) in accordance with identified best practices or other effective methods (for example, learned by way of historical data captured over a period of time) for generating thorough, comprehensive, and actionable incident reports, such that the generated report includes a summary section (for example, a blameless, high-level summary describing the incident event and the services, systems, and users that were affected, a severity of the incident event, a duration of the incident event, and so forth), a timeline section (for example, a chronological timeline of the incident event and the incident response, as well as event log data), a learnings section (for example, an identification of what went well, what did not go well, next steps, preventive measures, and so forth), a root-cause analysis section (for example, an identification of the origin of the incident event and any hypothesis as to the cause thereof), and an action-items section (for example, a list of action items completed or to be completed in response to the incident event). In this way, the present embodiments may improve the reliability and maintainability of operational processes and operational workflows of the computer system 108 by automatically generating and performing post-incident analyses and reports suitable for reinforcing best practices and optimal operation of the computer system 108.

2.3 Incident Management System and Data Ecosystem

Figure 3:
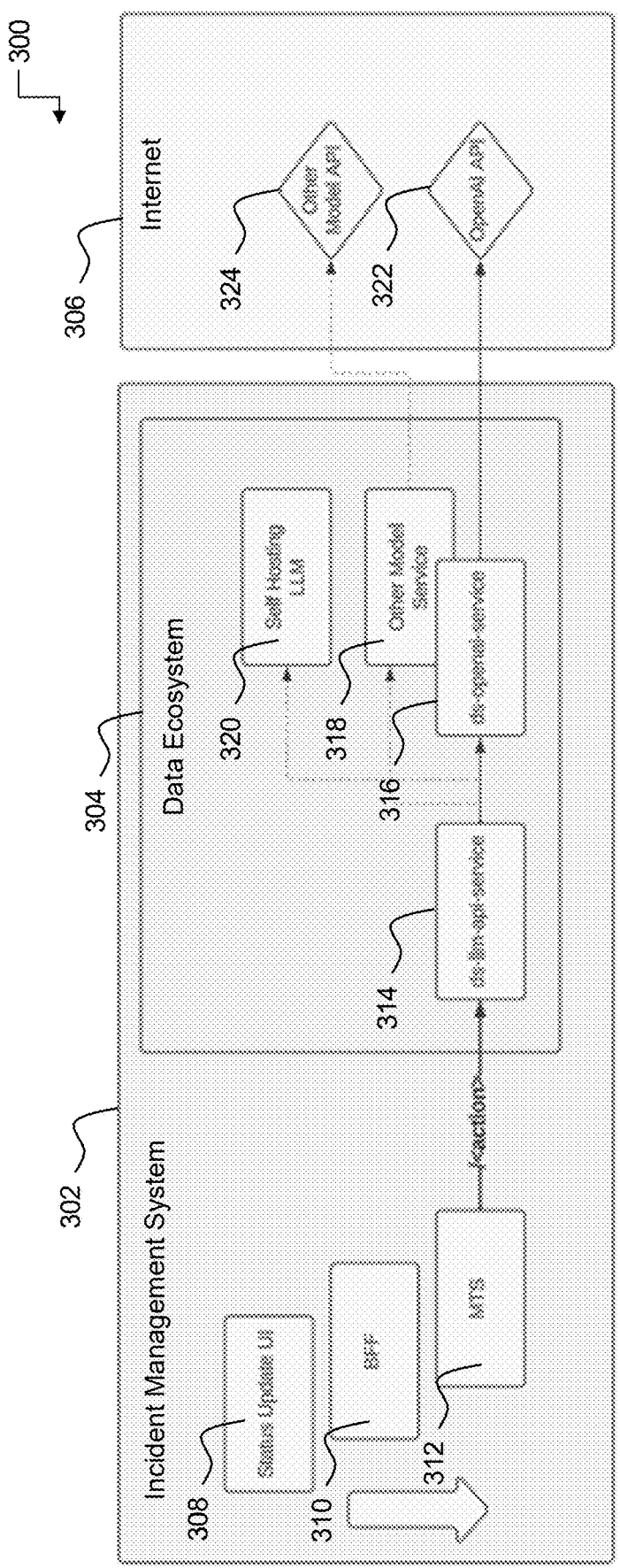
FIG. 3 illustrates an example of an incident management system and data ecosystem.

FIG. 3 illustrates an example of an incident management system and data ecosystem 300. As depicted, the incident management system and data ecosystem 300 include an incident management system 302 interfacing with a data ecosystem 304 and one or more large language models (LLMs) 306. In certain embodiments, the incident management system 302 may be identical to the incident management system 102 and the incident management system 202, as discussed above with respect to FIGS. 1 and 2, respectively. In certain embodiments, the incident management system 302 may include one or more functional components, such as a status update user interface (UI) component 308, a backend for frontend (BFF) component 310, and a microservices component 312. The status update UI component 308 may include a UI for allowing, for example, users or stakeholders 222 (for example, SREs, MTS, and so forth) to select to have an incident report generated. The BFF component 310 may include a service layer between the status update UI component 308 and the microservices component 312 for interfacing with one or more downstream APIs. In one embodiment, the microservices component 312 may correspond to, or be associated with, the prompt generation service 210 and may be utilized to facilitate providing prompts generated by the prompt generation service 210 to the data ecosystem 304.

In certain embodiments, the data ecosystem 304 may include an LLM API service component 314, an OPENAI API service component 316, another model API service component 318, and a self-hosting LLM API service component 318. In certain embodiments, the LLM API service component 314 may receive inputs (for example, prompts) from the data ecosystem 304 may then perform one or more QA assessments based on the content of the received inputs (for example, prompts). For example, in one embodiment, the LLM API service component 314 may perform one or more QA assessments to ensure that the input (for example, prompt) is in accordance with, for example, the identified best practices or other effective methods (for example, learned by way of historical data captured over a period of time) for generating thorough, comprehensive, and actionable incident reports. In another embodiment, the LLM API service component 314 may perform one or more QA assessments to identify and remove any noisy data from the input (for example, prompt).

In certain embodiments, the LLM API service component 314 may then select one of the OPENAI API service component 316, the other model API service component 318, or the self-hosting LLM API service component 318 for executing the prompt based on the content of the received input (for example, prompt). In certain embodiments, upon the LLM API service component 314 selecting one of the OPENAI API service component 316, the other model API service component 318, or the self-hosting LLM API service component 318 for executing the prompt, the LLM API service component 314 may then transmit the finalized prompt over the network 306 to one of the OPENAI API component 322 or other model API component 324 based on the selection.

2.4 Prompt Generation Service Utilizing Map Reduce

Figure 4:
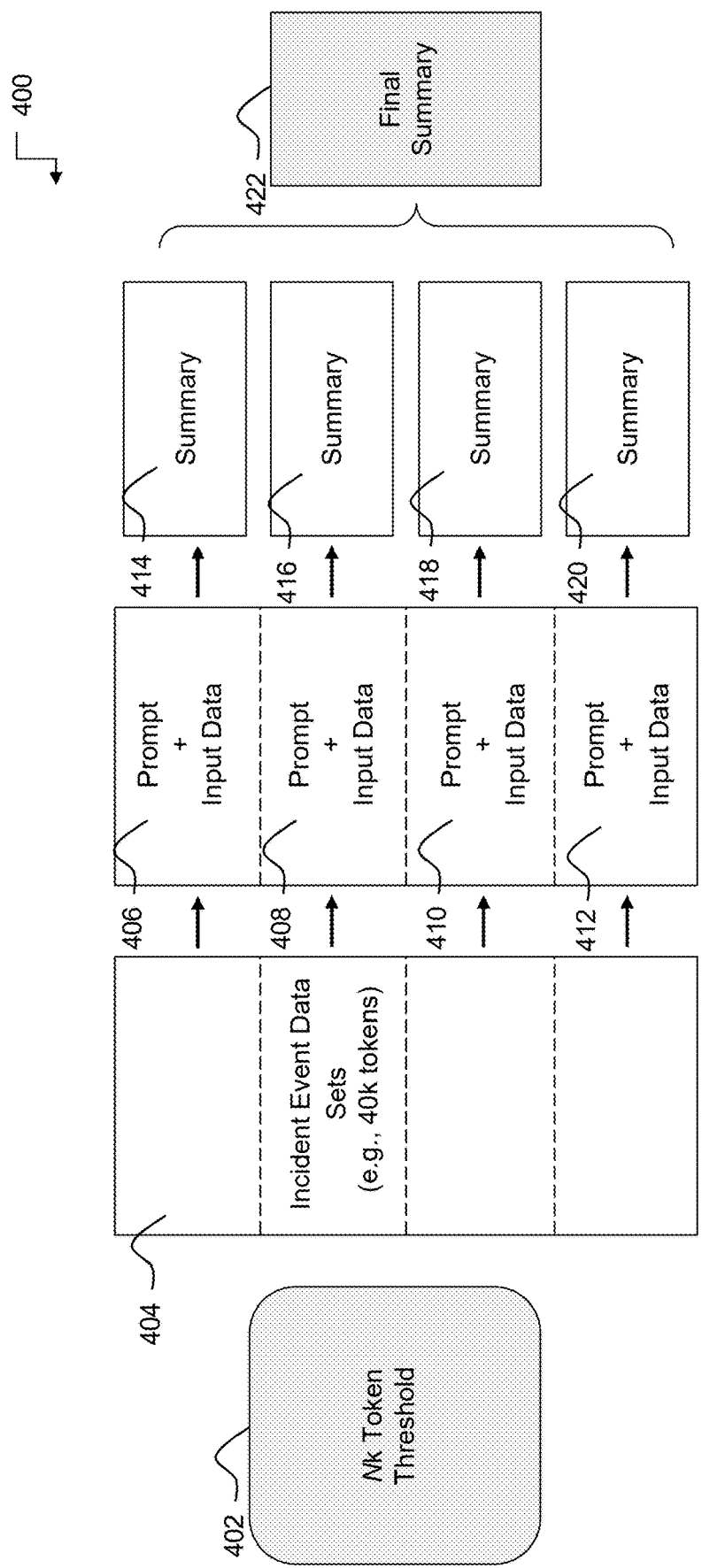
FIG. 4 illustrates an example workflow diagram of a map-reduce technique as utilized by a prompt generation service.

FIG. 4 illustrates an example workflow diagram 400 of a map-reduce technique as utilized by a prompt generation service. In certain embodiments, the workflow diagram 400, as illustrated, may be executed by the prompt generation service 210 of the machine-learning model manager 208, as discussed with respect to FIG. 2. As depicted, the workflow diagram 400 illustrates that certain machine-learning models (for example, LLMs) may include a context length or token threshold 402 (for example, Nk token threshold), and thus for prompts or data sets above the token threshold (for example, Nk token threshold), the machine-learning model (for example, LLM) may underperform because the prompt would otherwise be larger than the context length utilized to make a call to the machine-learning model (for example, LLM). For example, in one embodiment, the token threshold may include, for example, a threshold of approximately 4,000 tokens, approximately 8,000 tokens, approximately 16,000 tokens, or approximately 32,000 tokens.

Thus, in certain embodiments, it may be useful for the prompt generation service 210 to execute a map-reduce technique (for example, MapReduce Chain) for generating a prompt in accordance with the context length or token threshold 402 (for example, Nk token threshold). For example, in some embodiments, the prompt generation service 210 may access an incident event data set 404 that includes a context length or token limit that is larger than the context length or token threshold 402 (for example, Nk token threshold) associated with the machine-learning model (for example, LLM). In accordance with the presently disclosed embodiments, the prompt generation service 210 may execute a map-reduce algorithm (for example, MapReduce Chain), which may be utilized to divide the incident event data set 404 into a number of subsets of information 406, 408, 410, and 412 (for example, "chunks" of data that fit within the token threshold of the LLM) in accordance with a token threshold associated with the machine-learning model (for example, LLM).

For example, in one embodiment, the number of subsets of information 406, 408, 410, and 412 may each include a context length or token limit that is less than or equal to the context length or token threshold 402 (for example, Nk token threshold). In certain embodiments, for each of the number of subsets of information 406, 408, 410, and 412, the prompt generation service 210 may then input a first prompt into the machine-learning model (for example, LLM) suitable for prompting the machine-learning model (for example, LLM) to generate a respective prediction of a textual summary 414, 416, 418, and 420 based on the number of subsets of information 406, 408, 410, and 412. In certain embodiments, the prompt generation service 210 may also input a second prompt into the machine-learning model (for example, LLM) suitable for prompting the machine-learning model (for example, LLM) to generate a prediction of a final textual summary 422 based on the respective predictions of textual summaries 414, 416, 418, and 420. That is, the second prompt may prompt the machine-learning model (for example, LLM) to output a final textual summary 422, which is a combined summary of the textual summaries 414, 416, 418, and 420.

2.5 Prompt Generation Service Utilizing Note-Taking

Figure 5:
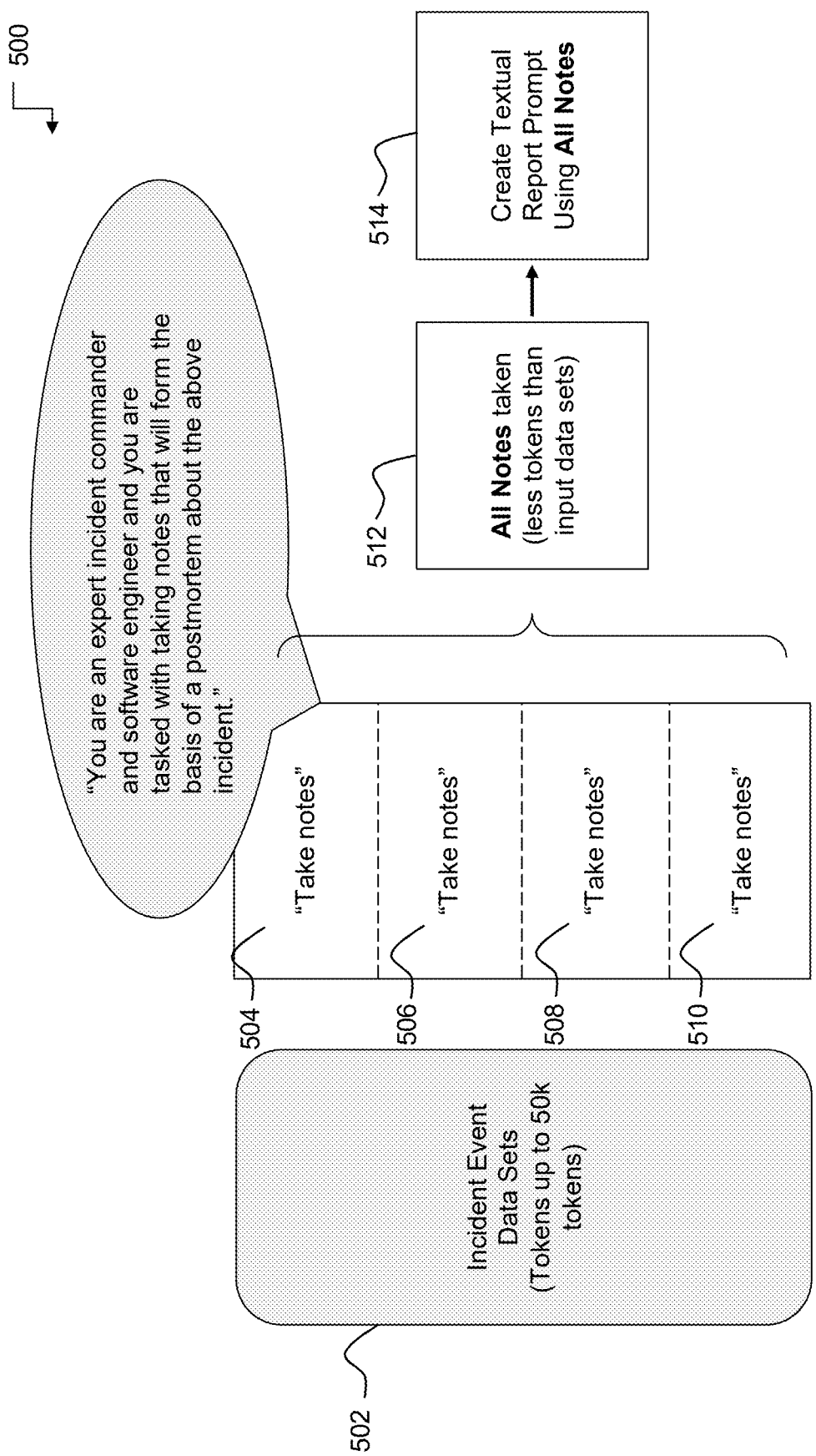
FIG. 5 illustrates an example workflow diagram of a note-taking technique as utilized by a prompt generation service.

FIG. 5 illustrates an example workflow diagram 500 of a note-taking technique as utilized by a prompt generation service. In certain embodiments, the workflow diagram 500, as illustrated, may be executed by the prompt generation service 210 of the machine-learning model manager 208, as discussed with respect to FIG. 2. As discussed above with respect to FIG. 4, certain machine-learning models (for example, LLMs) may include a context length or token threshold 402 (for example, Nk token threshold), and thus for prompts or data sets above the token threshold (for example, Nk token threshold), the machine-learning model (for example, LLM) may underperform because the prompt would otherwise be larger than the context length utilized to make a call to the machine-learning model (for example, LLM).

Thus, in certain embodiments, it may be useful for the prompt generation service 210 to execute a note-taking technique (for example, a note-taking algorithm) for generating a prompt in accordance with the context length or token threshold 402 (for example, Nk token threshold). For example, in some embodiments, the prompt generation service 210 may access an incident event data set 502 that includes a context length or token limit that is larger than the context length or token threshold 402 (for example, Nk token threshold) associated with the machine-learning model (for example, LLM). In accordance with the presently disclosed embodiments, the prompt generation service 210 may execute a note-taking technique (for example, a note-taking algorithm), which may be utilized to divide the incident event data set 502 into a number of subsets of information 504, 506, 508, and 510 (for example, "chunks"

of data that fit within the token threshold of the LLM) in accordance with a token threshold associated with the machine-learning model (for example, LLM).

For example, in one embodiment, the number of subsets of information 504, 506, 508, and 510 may each include a context length or token limit that is less than or equal to the context length or token threshold 402 (for example, Nk token threshold). In certain embodiments, for each of the number of subsets of information 504, 506, 508, and 510, the prompt generation service 210 may then input a first prompt into the machine-learning model (for example, LLM) suitable for prompting the machine-learning model (for example, LLM) to generate a set of note-taking texts 512 (for example, notes taken that will inform the basis of a generated incident report) based on the number of subsets of information 504, 506, 508, and 510.

In certain embodiments, the first prompt for prompting the machine-learning model (for example, LLM) to generate the set of note-taking texts 512 (for example, notes taken that will inform the basis of a generated incident report) may include taking notes for generating a summary section (for example, a blameless, high-level summary describing the incident event and the services, systems, and users that were affected, a severity of the incident event, a duration of the incident event, and so forth), a timeline section (for example, a chronological timeline of the incident event and the incident response, as well as event log data), a learnings section (for example, an identification of what went well, what did not go well, next steps, preventive measures, and so forth), a root-cause analysis section (for example, an identification of the origin of the incident event and any hypothesis as to the cause thereof), and an action-items section (for example, a list of action items completed or to be completed in response to the incident event) of the generated incident report.

In certain embodiments, the prompt generation service 210 may also input a second prompt into the machine-learning model (for example, LLM) suitable for prompting the machine-learning model (for example, LLM) to generate a report 514 of the incident event based on the sets of note-taking texts 512 (for example, notes taken that informs the basis of a generated incident report). That is, the second prompt may prompt the machine-learning model (for example, LLM) to output a generated report 514 that combines all of the sets of note-taking texts 512 (for example, notes for generating the summary section, timeline section, learnings section, root-cause analysis section, and action-items section).

2.6 Automatically Generating a Report of an Incident Event

Figure 6:
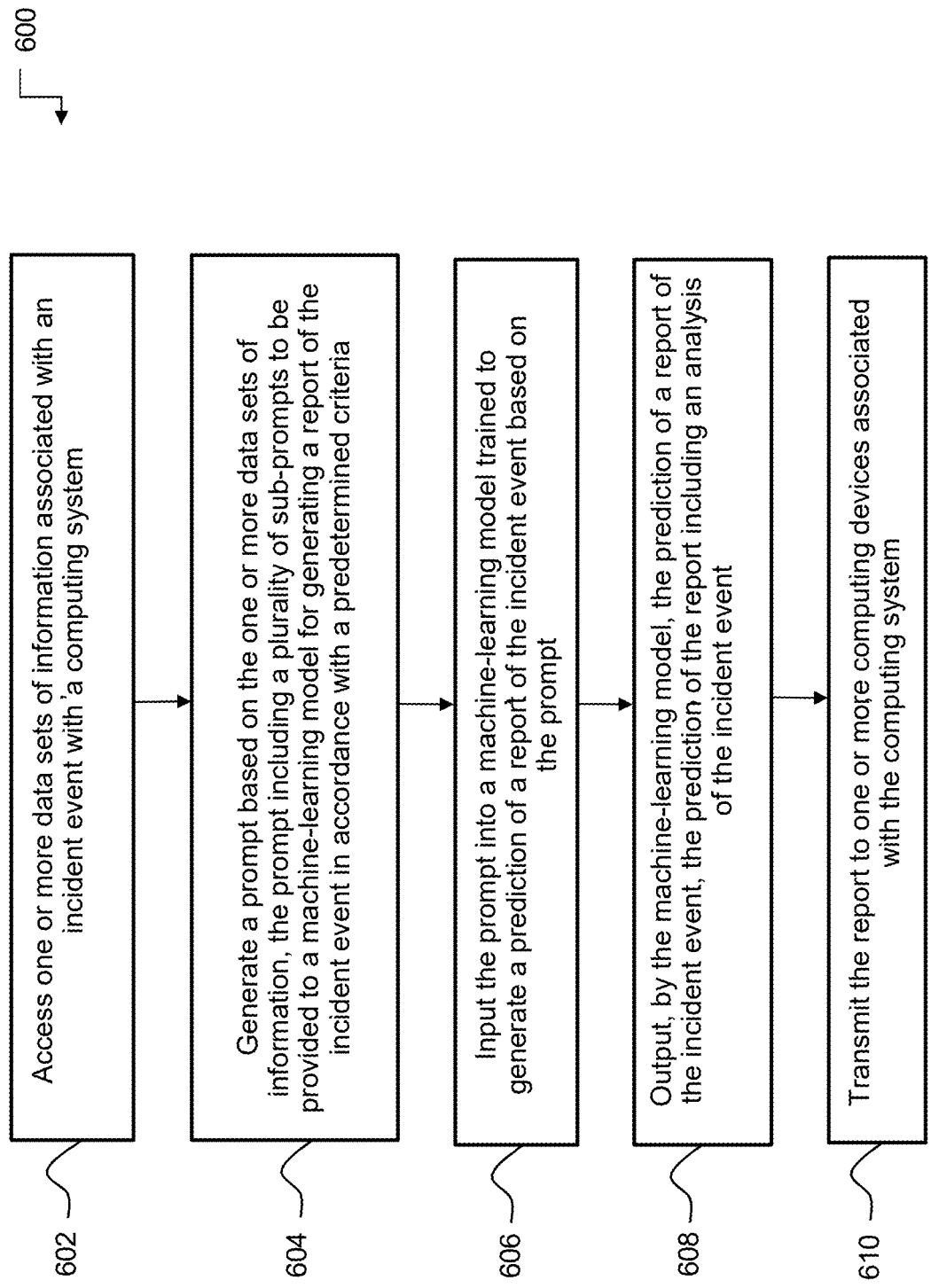
FIG. 6 illustrates a flow diagram of an example method for automatically generating a report of an incident event with a computer system.

FIG. 6 illustrates a flow diagram of method 600 for automatically generating a report of an incident event with a computer system in accordance with the disclosed embodiments. The method 600 may be performed utilizing one or more processing devices (for example, one or more processors 104 as discussed above with respect to FIG. 1 or one or more processors associated with an external LLM) that may include hardware (for example, a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a deep learning processor (DLP), a tensor processing unit (TPU), a neuromorphic processing unit (NPU), or any other artificial intelligence (AI) accelerator device(s) that may be suitable for processing various incident event data and making one or more predictions or decisions based thereon), firmware (for example, microcode), or some combination thereof.

Method 600 may begin at block 602 with one or more processing devices (for example, one or more processors 104) accessing one or more data sets of information associated with an incident event with a computer system. To access information, a processing device, or a service or program executing on the processing device, can programmatically call a specified endpoint or API call. A call can specify an incident identifier. When called, the endpoint loads text data and messages associated with the incident identifier, programmatically sends the text data and messages to a machine learning model such as an LLM, and uses the response to create and digitally store a first draft for a postmortem. In various embodiments, the LLM is accessed directly using an interface service or using a text summarization service. In some embodiments, the first draft of the postmortem overwrites any previously created draft or version of a postmortem for the same incident. Storage can occur in a data storage repository of a virtual computing facility, such as S3. The format of storage can comprise any structured storage that is useful in data processing; one example is using JSON files to store postmortems.

In one embodiment, the method 600 is programmed to include one or more validation steps, such as validating that an incident identifier exists in a database of incidents, validating that the incident identifier is associated with an account that is transmitting the call, and validating that the account or user has permissions to create a postmortem. Failing any of the validating steps can cause method 600 to return a message with an error code or error text.

For example, in certain embodiments, one or more processors 104 may access one or more data sets of textual documents (for example, incident log entries or ILEs, notes, writeups, emails, forms, webpages, meeting minutes, and so forth) or textual messages (for example, text messages, chat messages, instant messages in an IM system like SLACK, posts, transcripts, and so forth) that were produced, for example, by site reliability engineers (SREs) associated with an incident response to the incident event (for example, reduced service performance, a downtime, an outage, or a failure) with the computer system 108.

Method 600 may continue at block 604 with one or more processing devices (for example, one or more processors 104) generating a prompt based on one or more data sets of information. In certain embodiments, one or more processors 104 may generate the prompt by generating a number of sub-prompts to be provided to a machine-learning model for generating a report of the incident event in accordance with predetermined criteria. For example, in certain embodiments, one or more processors 104 generate one or more of an N-shot prompt, a chain-of-thought (COT) prompt, or a generated knowledge prompt that may be suitable for prompting a machine-learning model (for example, LLM) to generate a report of the incident event (for example, reduced service performance, a downtime, an outage, or a failure) with the computer system 108 in accordance with predetermined criteria. In certain embodiments, the predetermined criteria may include, for example, criteria identified based on a historical aggregate of analyses of incident events (for example, best practices or other effective methods for producing thorough, comprehensive, and actionable incident reports) with a computer system 108.

TABLE 2 is an example template that can be used programmatically at block 604 to generate an engineered prompt to produce a postmortem automatically. In an embodiment, block 604 can be programmed to read the template from digital storage, search for substitution strings denoted using curly braces { }, and substitute context data that was obtained at block 602. For example, the string {msgs} is a placeholder and, in a working embodiment, would be substituted with the text of messages from a chat message system, instant message system, email system, or other system for recording communications between engineers or other responders when responding to an incident. Similarly, {slack_conversation} is a placeholder to be substituted with the text of a conversation in the SLACK messaging system; other embodiments may use systems other than SLACK. The string {input_notes} should be substituted with text representing notes taken by a software engineer detailing an incident response. Enumerated values that specify the number of paragraphs, and elements of the template of a postmortem stated below, also can vary in different embodiments and the specific values are not critical for all embodiments.

TABLE 2

PROMPT TEMPLATE EXAMPLE post_mortem = '''
{msgs}
The above are chat logs and/or timeline entries documenting actions taken by engineers while responding to an incident. Compose a postmortem based on the above that has the following sections:
Summary:
Briefly describe what happened, the impact, and the next steps. Do not mention anyone's name. Should be at most two paragraphs.
Timeline:
List the major events and turning points of the incident. Here's an example of what to include:
- Incident triggered
- Responders acknowledged
- Responders joined incident response
- Status update messages
- Any major events discussed
- Root cause discovered
- Fix found and deployed
- Escalations
and more...
The timeline should be in the form of a JSON, with a timestamp and the description of the event. For example:
[
    {{"timestamp": <<timestamp>>, "event": <<event_1_name>>}},
    {{"timestamp": <<timestamp>>, "event": <<event_2_name>>}},
    ... etc.
]
During The Incident:
A longer narrative about what happened during the incident. Consider this the story of the incident. The goal here is to let people who weren't in the incident experience the incident vicariously. Your primary audience for this section is engineers.
Impact :
What impact did the incident have? On the team? On customers? Should be at most 2 paragraphs.
What went well:
A short paragraph about what went well during the incident.
What didn't go well:
A short paragraph about what did not go well during the incident.
Action Items:
A bulleted list (use "-" as the bullet) about any action items that need to be completed as a result of the incident. Here's an example of what can be considered as action items:
- What to-dos are left over to clean up from actions during this incident?
- How can we prevent this specific incident from happening again?
- How can we improve our ability to detect this kind of incident?
- What can we do to adapt and improve our ability to avoid and respond to incidents that aren't the same as this one?
The output template should be a JSON in the following format:
{{
  sections: [
    {{"title": "Summary", "output": <<insert summary text section here>>}}, TABLE 2-continued

PROMPT TEMPLATE EXAMPLE

{{"title": "Timeline", "output": <<insert timeline nested JSON list here>>}},
    {{"title": "During the Incident", "output": <<insert during the incident text section here>>}},
    {{"title": "Impact", "output": <<insert impact text section here>> }},
    {{"title": "What went well?", "output": <<insert what went well text section>>}},
    {{"title": "What didn't go well?", "output": <<insert what didn't go well text section>>}},
    {{"title": "Action Items", "output": <<insert action items text section here>>}}
  ]
}}
The output of the "Timeline" should be a nested list as shown in the example above. If we do not have a datetime for a particular item in the timeline, do not include it.
All double quotes for each value field should be escaped. For example, "Hello "World"" should be "Hello \"World\""
'''
notes = '''

{slack_conversation}

The above, delimited by ####, is a (partial) slack conversation detailing an incident response at your company.
You are an expert incident commander and software engineer and you are tasked with taking notes that will form the basis of a postmortem about the above incident.
When taking notes, consider the following:
- What happened?
- What are some of the turning points in the incident?
- How was the problem detected?
- What was the trigger or precipitating cause for the incident and what happened immediately before the incident that took the system from a working state to a degraded state?
- What was the incident's impact to customers?
- What did we try and whether it worked or not?
- What went well?
- What did not go well?
- What are our action items?
- What other areas should we be focusing on to prevent similar issues in the future?
- How can we mitigate this incident in the future?
The notes you take should be outputted in the following JSON format:
{{
  "notes": [
    {{"1": {{"timestamp": <<timestamp>>, "note": <<content>>}}
}},
    {{"2": {{"timestamp": <<timestamp>>, "note": <<content>>}}
}},
    {{"3": {{"timestamp": <<timestamp>>, "note": <<content>>}}
}},
    ... etc.
  ]
}}
post_mortem = '''

{input_notes}

The above, delimited by ####, are in-depth notes taken by a software engineer detailing an incident response at your company.
You are an expert incident commander and is tasked with composing a postmortem based on the above notes.
The postmortem should have the following sections:
Summary:
Briefly describes what happened, the impact, and the next steps. Do not mention anyone's names. Should be at most two paragraphs.
Timeline:
List the major events and turning points of the incident. Here's an example what to include:
- Incident triggered
- Responders acknowledged
- Responders joined incident response
- Status update messages
- Any major events discussed
- Root cause discovered
- Fix found and deployed

TABLE 2-continued

PROMPT TEMPLATE EXAMPLE

- Escalations
The timeline should be in the form of a JSON, with a timestamp and a
description of the event. For example:
[
    {{"timestamp": <<timestamp>>, "event": <<event_1_name>>}},
    {{"timestamp": <<timestamp>>, "event": <<event_2_name>>}},
    ... etc.
]
During The Incident:
A longer narrative about what happened during the incident. Consider
this the story of the incident. The goal here is to let people who
weren't in the incident experience the incident vicariously. Your
primary audience for this section are engineers.
Impact :
What impact did the incident have? On the team? On customers? Should
be at most 2 paragraphs.
What went well:
A short paragraph about what went well during the incident.
What didn't go well:
A short paragraph about what did not go well during the incident.
Action Items :
A list of any action items that need to be completed as a result of
the incident. Here's an example of what can considered action items:
- What to-dos are left over to clean up from actions during this
incident?
- How can we prevent this specific incident from happening again?
- How can we improve our ability to detect this kind of incident?
- What can we do to adapt and improve our ability to avoid and respond
to incidents that aren't the same as this one?
The action items should be a string and also in the form of a bulleted
list using "-" as the bullet. For example:
- <<action item 1>>
- <<action item 2>>
- <<action item 3>>
.. etc.
The output template should be a JSON in the following format:
{{
  sections: [
    {{"title": "Summary", "output": <<insert summary text section
here>>}},
    {{"title": "Timeline", "output": <<insert timeline nested
JSON list here>>}},
    {{"title": "During the Incident", "output": <<insert during
the incident text section here>>}},
    {{"title": "Impact", "output": <<insert impact text section
here>>}},
    {{"title": "What went well?", "output": <<insert what went
well text section>>}},
    {{"title": "What didn't go well?", "output": <<insert what
didn't go well text section>>}},
    {{"title": "Action Items", "output": <<insert action items
text section here>>}}
  ]
}}
The output of the "Timeline" should be a nested list as shown in the
example above. If we do not have a date or time for a particular item
in the timeline, do not include it.
All double quotes for each value field should be escaped. For example,
"Hello "World"" should be "Hello \"World\"".
"""

Method 600 may continue at block 604 with one or more processing devices (for example, one or more processors 104) inputting or presenting the prompt into a machine-learning model trained to generate a report of the incident event based on the prompt. For example, in certain embodiments, one or more processors 104 may input the prompt into a machine-learning model by transmitting the prompt to one or more LLM APIs associated with one or more LLMs and/or calling the LLM APIs.

Method 600 may continue at block 608 with one or more processing devices outputting, by the machine-learning model, the report of the incident event. For example, in certain embodiments, one or more processors 104 may receive as a response to the prompt an output of the machine-learning model (for example, LLM), in which the output may include a report of the incident event. In one embodiment, the report of the incident event may include, for example, a detailed analysis of the incident event.

In an embodiment, the method 600 is programmed to include, in a prompt to the LLM, instructions to apply filtering for security purposes. Filtering instructions can improve resistance to prompt injection or other issues that could arise from accepting arbitrary user input. The method 600 can be implemented as an asynchronous operation if response times from a public LLM API call become too slow. The method 600 can be programmed to respond to throttling or excessive response times by returning error messages.

For example, in accordance with the presently disclosed embodiments, the machine-learning model (for example, LLM) may generate a report of the incident event with the computer system 108 in accordance with predetermined criteria (for example, best practices criteria identified based on a historical aggregate of analyses of incident events) and a predetermined format. In one embodiment, the predetermined format may include, for example, a JSON file including a summary section (for example, a blameless, high-level summary describing the incident event and the services, systems, and users that were affected, a severity of the incident event, a duration of the incident event, and so forth), a timeline section (for example, a chronological timeline of the incident event and the incident response, as well as event log data), a learnings section (for example, an identification of what went well, what did not go well, next steps, preventive measures, and so forth), a root-cause analysis section (for example, an identification of the origin of the incident event and any hypothesis as to the cause thereof), and an action-items section (for example, a list of action items completed or to be completed in response to the incident event).

Method 600 may conclude at block 610 with one or more processing devices (for example, one or more processors 104) transmitting the report to one or more computing devices associated with the computer system. For example, in one embodiment, upon receiving as a response to the prompt the output of the machine-learning model (for example, LLM) corresponding to a report of the incident event, one or more processors 104 may then transmit the generated report to one or more computing devices associated with the computer system 108.

2.7 Automatically Generating Questions for Postmortem Generation

In an embodiment, machine-learning model manager 116 can be programmed to automatically generate, based on postmortem data, questions that are useful during an event to support remediation efforts and/or investigations of incidents. Incident management instructions 132 can be programmed to implement an incident remediation application. In one embodiment, incident management instructions 132 can be programmed to, after receiving an event, ask a responder a plurality of questions, such as: What recent changes were made? What customers are being impacted? Are any other services impacted? Upon receiving responses, incident management instructions 132 can be programmed to query other data sources and provide the responses and data from other sources to an LLM to produce results.

In an embodiment, management instructions 132 can be programmed not to prompt the responder with structured, fixed questions such as the foregoing but to receive questions from the responder that the responder may formulate in any manner based on the event data. In an embodiment, management instructions 132 can be programmed to execute the following process:

1. Access post mortem data in storage 106 and perform topic modeling or other characterization of the data to understand what types of questions are being asked (and answered) that were helpful to resolving. The result of this step is a candidate set of questions. Step 1 can be implemented using multiple methods depending on the quality of post mortem data in storage 106. For example, one post mortem could comprise a plurality of "Why?" questions associated with answers specific to the incident covered in the post mortem. As a specific example, question and answer pairs could comprise: Why did the service go offline? Because memory was exhausted. Why was memory exhausted? Because of a bad roll out of errant code. Why wasn't the code tested in pre-production? It was, but we did not have a use case for this particular issue. Why didn't we have a use case for this particular issue? It was missed in design. Why was it missed in design? Because we don't look at testing in design.

A post-mortem with questions and answers stored in this format can be parsed and extracted straightforwardly under program control. For post-mortems that do not contain similar questions and answers, post-mortems, management instructions 132 can be programmed to form and transmit a prompt to an LLM API similar to "What were the questions asked during the retro?" The management instructions 132 can also be programmed to access status updates and prompt the LLM API to generate a first-pass set of questions as seed training data for the neural network machine learning model described above. An example prompt to an LLM API is:

As a developer who has to own fixing this code such that this does not occur again as well as making sure this type of issue is not present in other areas of the code, what questions should I be asking in writing a post-mortem for the following issue: At 10:52 pm Sunday UTC, multiple services on GitHub.com were affected by a network partition and subsequent database failure resulting in inconsistent information being presented on our website An example response from the LLM API for the preceding prompt is:

In writing a post-mortem for the described issue, you should ask the following questions:

1. Root Cause Analysis: What caused the network partition and subsequent database failure? Were they related, or were they separate incidents?
2. System Dependencies: Which services were affected, and how are they interconnected? Were there any critical dependencies that contributed to the issue?
3. Failure Points: Were there any specific components in the affected services that failed? What were the reasons for these failures?
4. Recovery Mechanisms: Did the system have adequate recovery mechanisms in place for handling network partitions and database failures? If yes, why did they fail to prevent the inconsistency?
5. Monitoring and Alerts: Were there any monitoring and alerting mechanisms in place for detecting network and database issues? How effective were they?
6. Response Time: How quickly did the team detect the problem, and what was the initial response time to mitigate the issue?
7. Communication and Collaboration: How was communication handled within the team during the incident? Were there any challenges in collaborating to resolve the problem?
8. Data Consistency: How was the inconsistent information presented on the website identified and addressed? What were the potential impacts on users?
9. Preventive Measures: What steps will be taken to prevent a similar incident from occurring in the future? How can the affected code be improved to handle such scenarios?
10. Redundancy and Failover: Were there any redundancy or failover mechanisms in place, and how effective were they in ensuring service availability?
11. External Factors: Were there any external factors, such as increased traffic or maintenance activities, that might have contributed to the incident?
12. Post-Incident Testing: How will you validate the fixes and improvements made to the code and infrastructure? What additional tests will be performed to ensure system stability?
13. Documentation and Training: Will you update the documentation to include lessons learned from this incident? How will you train team members to avoid similar issues in the future?
14. User Impact and Communication: How will you communicate the post-mortem findings to users and stakeholders? Will there be any compensatory measures for affected users?
15. Continuous Improvement: How will you integrate the insights from this post-mortem into the development process to foster a culture of continuous improvement and resilience?

In an embodiment, management instructions 132 can be programmed to continue executing the process as follows:

2. Present the candidate questions, for example in a graphical user interface, with a prompt for input to specify whether each candidate question would be helpful to know real time during the incident, and receive and store the input from a responder specifying positive or negative feedback for each question.

3. Select a subset of questions to show in an online user interface for any and all incidents. Receive input from users specifying positive or negative feedback for each question in the subset in terms of relevance to the particular incident.

4. Present, in the user interface for an incident, a UI widget programmed to receive text specifying another question that the user deems to be relevant.

5. Based on the data received from step 3 and from step 4, train a neural network machine learning model on events paired with sets of questions. Thereafter, the trained machine learning model can be executed in the inference stage over event data for a new incident. In response, the trained machine learning model outputs a predicted set of questions for the incident. Consequently, each incident can be associated with a unique and best set of questions.

3. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices coupled using a network, such as a packet data network. The computing devices may be hardwired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
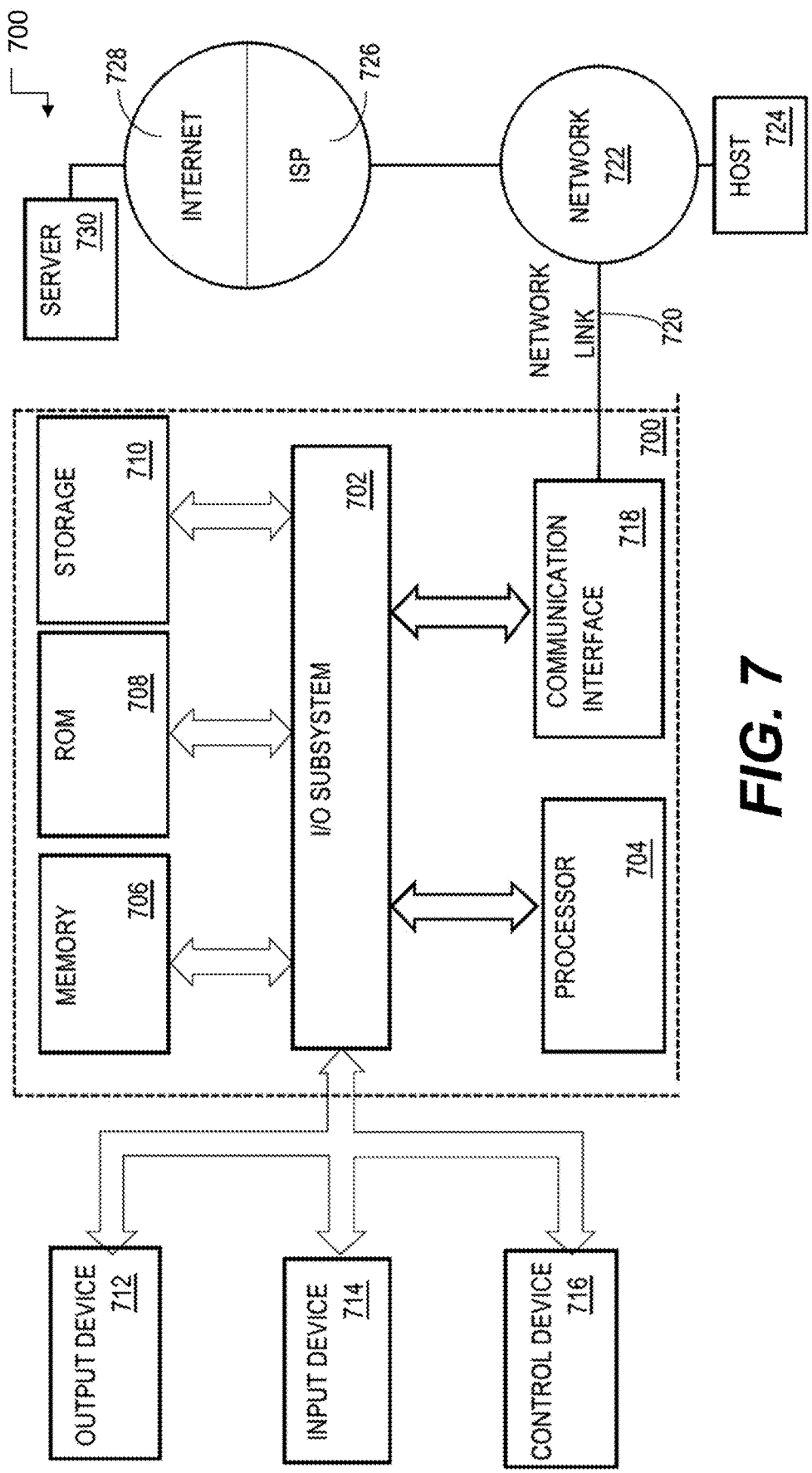
FIG. 7 illustrates a computer system with which one embodiment could be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software are represented schematically, for example, as boxes and circles, at the same level of detail that is commonly used by persons of ordinary skill in the art to which this disclosure pertains for communicating about computer architecture and computer systems implementations.

Computer system 700 includes an input/output (I/O) subsystem 702, which may include a bus and/or other communication mechanism(s) for communicating information and/or instructions between the components of the computer system 700 over electronic signal paths. The I/O subsystem 702 may include an I/O controller, a memory controller, and at least one I/O port. The electronic signal paths are represented schematically in the drawings, such as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system, a graphics processing unit (GPU), a digital signal processor, or an ARM processor. Processor 704 may comprise an integrated arithmetic logic unit (ALU) or be coupled to a separate ALU.

Computer system 700 includes one or more units of memory 706, such as a main memory, coupled to I/O subsystem 702 for electronically digitally storing data and instructions to be executed by processor 704. Memory 706 may include volatile memory such as various forms of random-access memory (RAM) or other dynamic storage device. Memory 706 may also be used for storing temporary variables or other intermediate information during the execution of instructions to be executed by processor 704. Such instructions, when stored in non-transitory computer-readable storage media accessible to processor 704, can render computer system 700 into a special-purpose machine customized to perform the operations specified in the instructions.

Computer system 700 includes non-volatile memory such as read-only memory (ROM) 708 or other static storage devices coupled to I/O subsystem 702 for storing information and instructions for processor 704. The ROM 708 may include various forms of programmable ROM (PROM), such as erasable PROM (EPROM) or electrically erasable PROM (EEPROM). A unit of persistent storage 710 may include various forms of non-volatile RAM (NVRAM), such as FLASH memory, solid-state storage, magnetic disk, or optical disks such as CD-ROM or DVD-ROM and may be coupled to I/O subsystem 702 for storing information and instructions. Storage 710 is an example of a non-transitory computer-readable medium that may be used to store instructions and data, which, when executed by processor 704, causes performing computer-implemented methods to execute the techniques herein.

The instructions in memory 706, ROM 708, or storage 710 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 700 may be coupled via I/O subsystem 702 to at least one output device 712. In one embodiment, output device 712 is a digital computer display. Examples of a display that may be used in various embodiments include a touchscreen display, a light-emitting diode (LED) display, a liquid crystal display (LCD), or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections, or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. The control device 716 may be a touchpad, a mouse, a trackball, or cursor direction keys for communicating direction information and command selections to processor 704 and for controlling cursor movement on an output device 712, such as a display. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism, or other control device. An input device 714 may include a combination of multiple input devices, such as a video camera and a depth sensor.

In another embodiment, computer system 700 may comprise an Internet of Things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders, and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server computer 730.

Computer system 700 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 702. Transmission media can also be acoustic or light waves generated during radio-wave and infrared data communications.

Various forms of media may carry at least one sequence of at least one instruction to processor 704 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal, and appropriate circuitry can provide the data to I/O subsystem 702 such as placing the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to a bus or I/O subsystem 502. Communication interface 718 provides a two-way data communication coupling to a network link(s) 720 directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may connect through network 722 to a host computer 724.

Furthermore, network link 720 may connect through network 722 or to other computing devices via internetworking devices and/or computers operated by an Internet Service Provider (ISP) 726. ISP 726 provides data communication services through a worldwide packet data communication network called Internet 728. A server computer 730 may be coupled to Internet 728. Server computer 730 broadly represents any computer, data center, virtual machine, or virtual computing instance with or without a hypervisor or computer executing a containerized program system such as DOCKER or KUBERNETES. Server computer 730 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 700 and server computer 730 may form elements of a distributed computer system that includes other computers, a processing cluster, a server farm, or other organizations of computers that cooperate to perform tasks or execute applications or services. Server computer 730 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 730 may comprise a web application server that hosts a presentation layer, application layer, and data storage layer, such as a relational database system using a structured query language (SQL) or no SQL, an object store, a graph database, a flat file system or other data storage.

Computer system 700 can send messages and receive data and instructions, including program code, through the network(s), network link 720, and communication interface 718. In the Internet example, server computer 730 might transmit a requested code for an application program through Internet 728, ISP 726, local network 722, and communication interface 718. The received code may be executed by processor 704 as it is received and/or stored in storage 710 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

What is claimed is:

1. A computer-implemented method executed using one or more processors of an incident management system, the computer-implemented method comprising:
   accessing one or more data sets of information associated with an incident event corresponding to an incident associated with a computer system;
   generating a prompt based on the one or more data sets of information, wherein generating the prompt comprises generating a plurality of sub-prompts to be provided to a machine-learning model for generating a report of the incident event in accordance with a predetermined criteria;
   inputting the prompt into a machine-learning model that has been trained to generate a report of the incident event based on the prompt;
   outputting, by the machine-learning model, the report of the incident event, wherein the report comprises an analysis of the incident event;
   wherein outputting the report of the incident event further comprises dividing the one or more data sets of information associated with the incident event into a plurality of subsets of information in accordance with a token threshold associated with the machine-learning model; for each particular subset of information of the plurality of subsets of information, inputting a first prompt into the machine-learning model configured to prompt the machine-learning model as trained to generate a prediction of a textual summary based on the particular subset of information; inputting a second prompt into the machine-learning model configured to prompt the machine-learning model as trained to generate a prediction of a final textual summary based on all predictions of the textual summaries;
   transmitting the report to one or more computing devices associated with the computer system.

2. The computer-implemented method of claim 1, wherein accessing the one or more data sets of information associated with the incident event comprises accessing one or more data sets of text documents or text messages produced by site reliability engineers (SREs) associated with a response to the incident event.

3. The computer-implemented method of claim 2, wherein the incident event comprises one or more of a reduced service performance, a downtime, an outage, a business process issue, or a failure of the computer system.

4. The computer-implemented method of claim 1, wherein generating the prompt comprises generating one or more of an N-shot prompt, a chain-of-thought (COT) prompt, or a generated knowledge prompt.

5. The computer-implemented method of claim 1, further comprising:
   inputting the prompt into the machine-learning model by transmitting the prompt to one or more large language models (LLMs) utilizing an application programming interface (API) associated with the one or more LLMs;

outputting, by the machine-learning model, the report of the incident event by receiving a response from the one or more LLMs.

6. The computer-implemented method of claim 5, further comprising, prior to transmitting the prompt to the one or more LLMs utilizing the API, performing one or more quality assurance (QA) assessments based on a content of the prompt.

7. The computer-implemented method of claim 1, wherein the token threshold comprises a threshold of approximately 4,000 tokens, approximately 8,000 tokens, approximately 16,000 tokens, or approximately 32,000 tokens.

8. The computer-implemented method of claim 1, wherein outputting the report of the incident event further comprises:

for each particular subset of information of the plurality of subsets of information, inputting a first prompt into the machine-learning model configured to prompt the machine-learning model as trained to generate a set of note-taking texts based on the particular subset of information;

inputting a third prompt into the machine-learning model configured to prompt the machine-learning model as trained to generate the report of the incident event based on all sets of the note-taking texts.

9. The computer-implemented method of claim 1, wherein outputting the report of the incident event comprises outputting, by the machine-learning model, the report of the incident event in accordance with the predetermined criteria identified based on a historical aggregate of analyses of incident events with a computer system.

10. The computer-implemented method of claim 1, further comprising outputting, by the machine-learning model, the report of the incident event in accordance with the predetermined criteria and a predetermined format.

11. The computer-implemented method of claim 10, wherein the predetermined format comprises a JavaScript Object Notation (JSON) file including a plurality of predetermined sections, each of the plurality of predetermined sections corresponding to a different sub analysis of the analysis of the incident event.

12. The computer-implemented method of claim 11, wherein the plurality of predetermined sections comprises two or more of a summary section, a timeline section, a learnings section, a root-cause analysis section, or an action-items section.

13. The computer-implemented method of claim 11, wherein inputting the prompt into the machine-learning model comprises inputting the plurality of sub-prompts into the machine-learning model, each of the plurality of sub-prompts being configured to prompt the machine-learning model to generate content corresponding to a different one of the plurality of predetermined sections.

14. The computer-implemented method of claim 1, wherein the machine-learning model comprises a large language model (LLM).

15. The computer-implemented method of claim 1, wherein the machine-learning model comprises a selected one of a plurality of large language models (LLMs).

16. One or more non-transitory computer-readable storage media storing one or more sequences of instructions which, when executed using one or more processors of an incident management system, cause the one or more processors to execute:

accessing one or more data sets of information associated with an incident event with a computer system;

generating a prompt based on the one or more data sets of information, wherein generating the prompt comprises generating a plurality of sub-prompts to be provided to a machine-learning model for generating a report of the incident event in accordance with a predetermined criteria;

inputting the prompt into a machine-learning model trained to generate a report of the incident event based on the prompt;

outputting, by the machine-learning model, the report of the incident event, wherein the report comprises an analysis of the incident event;

wherein outputting the report of the incident event further comprises dividing the one or more data sets of information associated with the incident event into a plurality of subsets of information in accordance with a token threshold associated with the machine-learning model; for each particular subset of information of the plurality of subsets of information, inputting a first prompt into the machine-learning model configured to prompt the machine-learning model as trained to generate a prediction of a textual summary based on the particular subset of information; inputting a second prompt into the machine-learning model configured to prompt the machine-learning model as trained to generate a prediction of a final textual summary based on all predictions of the textual summaries;

transmitting the report to one or more computing devices associated with the computer system.

17. The one or more non-transitory computer-readable storage media of claim 16, wherein the sequences of instructions that cause accessing the one or more data sets of information associated with the incident event further comprise sequences of instructions which, when executed using the one or more processors of an incident management system, cause the one or more processors to execute accessing one or more data sets of text documents or text messages produced by site reliability engineers (SREs) associated with a response to the incident event.

18. The one or more non-transitory computer-readable storage media of claim 17, wherein the incident event comprises one or more of a reduced service performance, a downtime, an outage, a business process issue, or a failure of the computer system.

19. The one or more non-transitory computer-readable storage media of claim 16, wherein the sequences of instructions that cause generating the prompt further comprise sequences of instructions which, when executed using the one or more processors of an incident management system, cause the one or more processors to execute generating one or more of an N-shot prompt, a chain-of-thought (COT) prompt, or a generated knowledge prompt.

20. The one or more non-transitory computer-readable storage media of claim 16, further comprising:

inputting the prompt into the machine-learning model by transmitting the prompt to one or more large language models (LLMs) utilizing an application programming interface (API) associated with the one or more LLMs;

outputting, by the machine-learning model, the report of the incident event by receiving a response from the one or more LLMs.

21. The one or more non-transitory computer-readable storage media of claim 20, further comprising sequences of instructions which, when executed using the one or more processors of an incident management system, cause the one or more processors to execute, prior to transmitting the prompt to the one or more LLMs utilizing the API, performing one or more quality assurance (QA) assessments based on a content of the prompt.

22. The one or more non-transitory computer-readable storage media of claim 16, wherein the token threshold comprises a threshold of approximately 4,000 tokens, approximately 8,000 tokens, approximately 16,000 tokens, or approximately 32,000 tokens.

23. The one or more non-transitory computer-readable storage media of claim 16, wherein the sequences of instructions that cause outputting the report of the incident event further comprise sequences of instructions which, when executed using the one or more processors of an incident management system, cause the one or more processors to execute:
   for each of the plurality of subsets of information, inputting a first prompt into the machine-learning model configured to prompt the machine-learning model as trained to generate a set of note-taking texts based on the subset of information;
   inputting a third prompt into the machine-learning model configured to prompt the machine-learning model as trained to generate the report of the incident event based on all sets of the note-taking texts.

24. The one or more non-transitory computer-readable storage media of claim 16, wherein the sequences of instructions that cause outputting the report of the incident event comprise sequences of instructions which, when executed using the one or more processors of an incident management system, cause the one or more processors to execute outputting, by the machine-learning model, the report of the incident event in accordance with the predetermined criteria identified based on a historical aggregate of analyses of incident events with a computer system.

25. The one or more non-transitory computer-readable storage media of claim 16, further comprising sequences of instructions which, when executed using the one or more processors of an incident management system, cause the one or more processors to execute outputting, by the machine-learning model, the report of the incident event in accordance with the predetermined criteria and a predetermined format.

26. The one or more non-transitory computer-readable storage media of claim 25, wherein the predetermined format comprises a JavaScript Object Notation (JSON) file including a plurality of predetermined sections, each of the plurality of predetermined sections corresponding to a different sub analysis of the analysis of the incident event.

27. The one or more non-transitory computer-readable storage media of claim 26, wherein the plurality of predetermined sections comprises two or more of a summary section, a timeline section, a learnings section, a root-cause analysis section, or an action-items section.

28. The one or more non-transitory computer-readable storage media of claim 26, wherein the sequences of instructions that cause inputting the prompt into the machine-learning model comprise sequences of instructions which, when executed using the one or more processors of an incident management system, cause the one or more processors to execute inputting the plurality of sub-prompts into the machine-learning model, each of the plurality of sub-prompts being configured to prompt the machine-learning model to generate content corresponding to a different one of the plurality of predetermined sections.

29. The one or more non-transitory computer-readable storage media of claim 16, wherein the machine-learning model comprises a large language model (LLM).

30. The one or more non-transitory computer-readable storage media of claim 16, wherein the machine-learning model comprises a selected one of a plurality of large language models (LLMs).

* * * * *